United States Patent
Tin (10) Patent No.: US 10,908,304 B2
(45) Date of Patent: Feb. 2, 2021

(54) PASSIVE SMART SENSOR DETECTION SYSTEM

(71) Applicant: Honeywell International Inc., Morris Plains, NJ (US)

(72) Inventor: Steven Tin, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/413,277

(22) Filed: May 15, 2019

(65) Prior Publication Data

US 2020/0363544 A1   Nov. 19, 2020

(51) Int. Cl.
*G01V 1/00* (2006.01)
*G08B 29/18* (2006.01)
*G08G 1/01* (2006.01)

(52) U.S. Cl.
CPC .......... *G01V 1/001* (2013.01); *G08B 29/185* (2013.01); *G08G 1/01* (2013.01)

(58) Field of Classification Search
None
See application file for complete search history.

(56) References Cited

U.S. PATENT DOCUMENTS

| | | | | |
|---|---|---|---|---|
| 3,351,938 A | * | 11/1967 | Gray | B61L 25/04 342/44 |
| 3,548,212 A | * | 12/1970 | Whetter | G01S 17/66 250/203.2 |
| 3,714,620 A | * | 1/1973 | Biren | G08G 1/015 367/136 |
| 3,719,928 A | * | 3/1973 | Oishi | H04Q 9/08 340/870.03 |
| 3,737,911 A | * | 6/1973 | Sakuragi | B61L 25/043 340/10.4 |
| 4,364,043 A | * | 12/1982 | Cole | G08G 1/017 340/10.34 |
| 4,527,151 A | * | 7/1985 | Byrne | G01S 13/87 340/554 |
| 4,694,699 A | * | 9/1987 | Cheeke | B06B 1/0644 73/606 |
| 4,746,830 A | * | 5/1988 | Holland | G07C 9/28 310/313 D |

(Continued)

FOREIGN PATENT DOCUMENTS

CN   102403981 A   4/2012

OTHER PUBLICATIONS

Palatnick et al. "Automatic Vehicle Identification Systems—Methods of Approach", IEEE Transactions on Vehicular Technology, vol. VT-19, No. 1, Feb. 1970, pp. 128-136.

*Primary Examiner* — Chico A Foxx
(74) *Attorney, Agent, or Firm* — Fogg & Powers LLC (57) ABSTRACT

A passive sensor detection system comprises an array of resonant mechanical sensors connected in series, with each of the resonant mechanical sensors configured to detect respectively different signature frequencies of a signal generated by a target of interest. A transmitter is operatively coupled to the array of resonant mechanical sensors, and a power supply is coupled to the array of resonant mechanical sensors and the transmitter. When the array of resonant mechanical sensors are triggered by the signal generated by the target of interest, the transmitter is powered on to transmit a signal indicating the detection of the target of interest.

20 Claims, 6 Drawing Sheets

(56) References Cited

U.S. PATENT DOCUMENTS

| | | | | |
|---|---|---|---|---|
| 4,827,395 A * | 5/1989 | Anders | G06K 17/0022 | |
| | | | 700/9 | |
| 5,173,706 A * | 12/1992 | Urkowitz | G01S 7/032 | |
| | | | 342/101 | |
| 5,235,326 A * | 8/1993 | Beigel | G01V 15/00 | |
| | | | 340/10.34 | |
| 5,544,525 A * | 8/1996 | Peterman | G01P 5/244 | |
| | | | 73/170.13 | |
| 5,691,698 A * | 11/1997 | Scholl | G01S 13/753 | |
| | | | 310/313 B | |
| 5,798,983 A * | 8/1998 | Kuhn | H04B 11/00 | |
| | | | 367/127 | |
| 5,880,351 A * | 3/1999 | Orita | G01H 11/06 | |
| | | | 200/61.51 | |
| 6,080,944 A * | 6/2000 | Itoigawa | H01H 1/0036 | |
| | | | 200/61.45 R | |
| 6,360,163 B1 * | 3/2002 | Cho | G08G 1/042 | |
| | | | 327/156 | |
| 6,788,204 B1 * | 9/2004 | Ianelli | G06K 19/0675 | |
| | | | 340/572.1 | |
| 6,819,246 B1 * | 11/2004 | Seppa | G06K 19/0726 | |
| | | | 340/572.7 | |
| 7,724,134 B2 | 5/2010 | Icove et al. | | |
| 7,791,249 B2 * | 9/2010 | Hines | H03H 9/14547 | |
| | | | 310/313 B | |
| 7,961,094 B2 | 6/2011 | Breed | | |
| 8,111,153 B2 * | 2/2012 | Kim | G08G 1/164 | |
| | | | 340/539.13 | |
| 8,169,356 B2 * | 5/2012 | Wu | G01S 13/56 | |
| | | | 342/28 | |
| 8,482,408 B1 * | 7/2013 | Cottrell | G01H 9/00 | |
| | | | 340/540 | |
| 8,525,644 B1 * | 9/2013 | Yonekura | G06Q 10/08 | |
| | | | 340/5.86 | |
| 8,907,769 B2 * | 12/2014 | Haines | H03H 9/64 | |
| | | | 340/10.3 | |
| 9,238,152 B2 * | 1/2016 | Coussios | A61N 7/00 | |
| 10,109,186 B2 * | 10/2018 | Blekken | G01S 13/87 | |
| 10,109,187 B2 * | 10/2018 | Lees | G08G 1/042 | |
| 10,122,736 B2 | 11/2018 | Baxley et al. | | |
| 10,353,060 B2 * | 7/2019 | Kofford | G08G 1/052 | |
| 2001/0047687 A1 * | 12/2001 | Abe | G01C 19/5607 | |
| | | | 73/504.16 | |
| 2004/0061511 A1 * | 4/2004 | Kawakatsu | G01F 23/0092 | |
| | | | 324/707 | |
| 2006/0136131 A1 * | 6/2006 | Dugan | G08G 1/14 | |
| | | | 701/300 | |
| 2006/0144147 A1 * | 7/2006 | Ishimaru | G01B 11/0666 | |
| | | | 73/579 | |
| 2006/0250279 A1 * | 11/2006 | Taniguchi | G08G 1/042 | |
| | | | 340/933 | |
| 2007/0237027 A1 * | 10/2007 | Sugiura | B60R 21/01338 | |
| | | | 367/96 | |
| 2007/0296305 A1 * | 12/2007 | Hines | H03H 9/14547 | |
| | | | 310/313 B | |
| 2008/0252431 A1 * | 10/2008 | Nigam | G08G 1/205 | |
| | | | 340/426.1 | |
| 2010/0008515 A1 * | 1/2010 | Fulton | H04R 3/005 | |
| | | | 381/92 | |
| 2010/0033722 A1 * | 2/2010 | Van Neste | G01N 29/2418 | |
| | | | 356/432 | |
| 2010/0080086 A1 * | 4/2010 | Wright | H04B 11/00 | |
| | | | 367/191 | |
| 2010/0269522 A1 * | 10/2010 | Schwarz | F25B 49/005 | |
| | | | 62/115 | |
| 2010/0284249 A1 * | 11/2010 | Steadman | G01S 7/52001 | |
| | | | 367/118 | |
| 2010/0331914 A1 * | 12/2010 | Hill | H04B 13/005 | |
| | | | 607/60 | |
| 2012/0139753 A1 * | 6/2012 | Finlay | G08G 1/04 | |
| | | | 340/905 | |
| 2012/0188078 A1 * | 7/2012 | Soles | G01N 29/04 | |
| | | | 340/540 | |
| 2012/0235257 A1 * | 9/2012 | Yoshida | G01P 15/097 | |
| | | | 257/418 | |
| 2012/0272740 A1 * | 11/2012 | Takahashi | G01H 1/003 | |
| | | | 73/660 | |
| 2012/0294119 A1 * | 11/2012 | Nikolovski | G01V 1/18 | |
| | | | 367/127 | |
| 2013/0139377 A1 * | 6/2013 | Noda | H03H 3/0072 | |
| | | | 29/594 | |
| 2013/0278357 A1 * | 10/2013 | Haines | H03H 9/642 | |
| | | | 333/193 | |
| 2014/0049259 A1 * | 2/2014 | Poon | G01R 33/34092 | |
| | | | 324/322 | |
| 2014/0210646 A1 * | 7/2014 | Subramanya | G06K 9/00812 | |
| | | | 340/928 | |
| 2016/0036958 A1 * | 2/2016 | Logan | H04W 68/00 | |
| | | | 455/414.1 | |
| 2017/0045479 A1 * | 2/2017 | Kim | G01N 29/4436 | |
| 2017/0105190 A1 * | 4/2017 | Logan | H04W 4/14 | |
| 2019/0293789 A1 * | 9/2019 | Grundfest | G01S 7/539 | |
| 2020/0096624 A1 * | 3/2020 | Brabant | G01S 5/0244 | |

* cited by examiner

PASSIVE SMART SENSOR DETECTION SYSTEM

BACKGROUND

With rapid growth of internet of things (IoT) technologies, unattended sensors are being widely used for applications including perimeter monitoring, urban environment threat detection, rural environmental monitoring, and critical infrastructure protection. However, current state of the art unattended sensor technologies are often limited by their operation lifetimes, due to power consumption by constant environmental monitoring for signals of interest. Conventional unattended sensors rely on wideband fast Fourier transform (FFT) based signal processing for signature extraction and identification, running at all times, even when the signal is not present, which consumes greater than about 90% of the sensor battery power.

There are efforts to reduce sensor power consumption with low power signal detection and processing electronics. Such approaches, however, still require active power and expensive application-specific integrated circuit (ASIC) chips, with performance often affected by environmental factors. While actively powered systems might be more powerful in terms of signal processing capabilities, for applications where the signal of interest is well defined, there is a need for a passive detection system that would significantly reduce power consumption, complexity, and cost.

SUMMARY

A passive sensor detection system comprises an array of resonant mechanical sensors connected in series, with each of the resonant mechanical sensors configured to detect respectively different signature frequencies of a signal generated by a target of interest. A transmitter is operatively coupled to the array of resonant mechanical sensors, and a power supply is coupled to the array of resonant mechanical sensors and the transmitter. When the array of resonant mechanical sensors are triggered by the signal generated by the target of interest, the transmitter is powered on to transmit a signal indicating the detection of the target of interest.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A passive signal detection system is described herein for applications where a signal of interest has a unique set of signature frequencies. The detection system is completely passive until a signal of interest is detected, thus significantly prolonging the lifetime and reducing the cost of the system. The detection system can significantly reduce power consumption and complexity, enabling new capabilities in long term unattended sensing for both defense and commercial applications.

In some example embodiments, the detection system comprises an array of resonant mechanical sensors connected in series. Each of the resonant mechanical sensors is configured to detect respectively different frequencies or signatures generated by a target of interest such as a vehicle. A transmitter, such as a radio frequency (RF) signal transmitter, is operatively coupled to the array of resonant mechanical sensors. A power supply is coupled the array of resonant mechanical sensors and the transmitter. In some example implementations, the detection system can be configured to detect specific vehicles at a specified distance traveling on a road. When the array of resonant mechanical sensors are triggered by the signal generated by the target of interest, the transmitter is powered on to transmit a signal to a base station indicating the detection of the target of interest.

To passively select and detect signatures at selected frequencies, high quality factor narrow band passive sensors with resonant frequencies tuned to the signature frequencies can be utilized. The narrow band nature of these sensors enable frequency decomposition and selection. In some embodiments, the resonant mechanical sensors can be acoustic sensors. In other embodiments, the resonant mechanical sensors can be vibration sensors, magnetic sensors, or the like. In some embodiments, the sensor array can be connected to the power supply of an RF signal transmitter.

The passive signal detection system can be implemented to detect various vehicles, which can be stationary or mobile vehicles. For example, the detection system can be implemented to detect a power generator, or a mobile ground vehicle such as a car, truck, or the like.

To eliminate false alarms due to wide band noise, one or more sensors designed at non-signature frequencies can be connected in series and coupled to the array of resonant mechanical sensors. A false positive due to wideband noise can be nulled with the non-signature sensors.

Further details of various embodiments are described hereafter with reference to the drawings.

Figure 1:
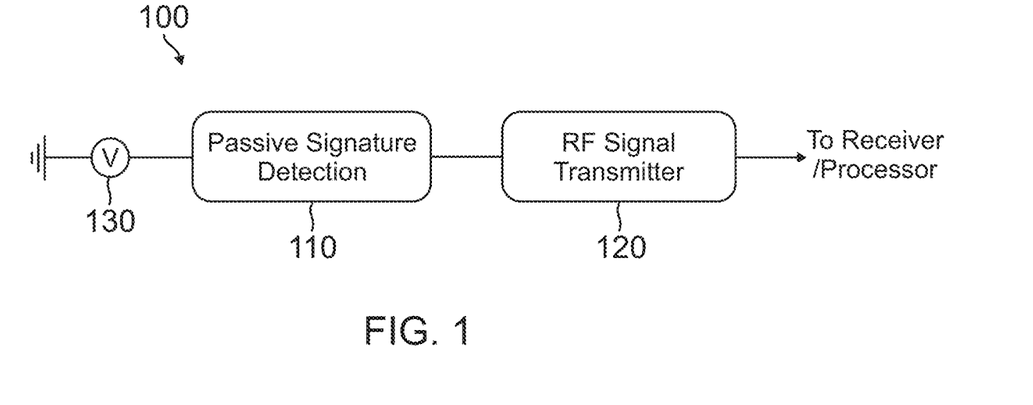
FIG. 1 is a block diagram of a passive smart sensor detection system, according to an exemplary implementation.

FIG. 1 is a block diagram of a passive smart sensor detection system 100 according to an exemplary implementation. The detection system 100 includes a passive signature detection assembly 110, which includes a plurality of resonant mechanical sensors as described further hereafter. An RF signal transmitter 120 is operatively coupled to the passive signature detection assembly 110. A power supply 130 is operatively coupled the passive signature detection assembly 110 and RF signal transmitter 120.

When the resonant mechanical sensors in passive signature detection assembly 110 are triggered by the signal generated by a target of interest, RF signal transmitter 120 is powered on. A signal indicating the detection of the target of interest is then transmitted from RF signal transmitter 120 to a receiver coupled to a processor in a base station.

Figure 2A:
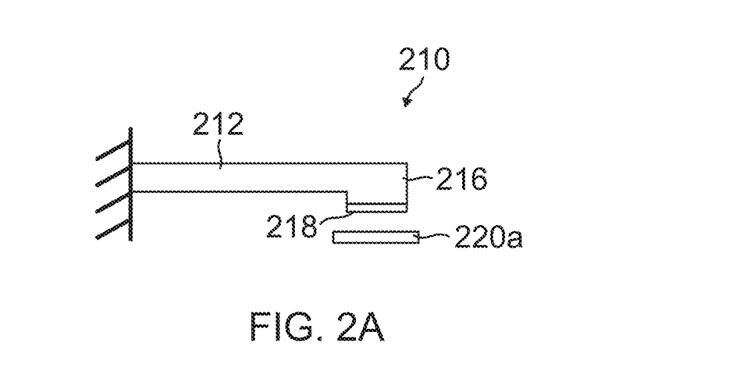
FIG. 2A is a side view of an exemplary resonant mechanical sensor, which can be employed in the passive smart sensor detection system of FIG. 1.
Figure 2B:
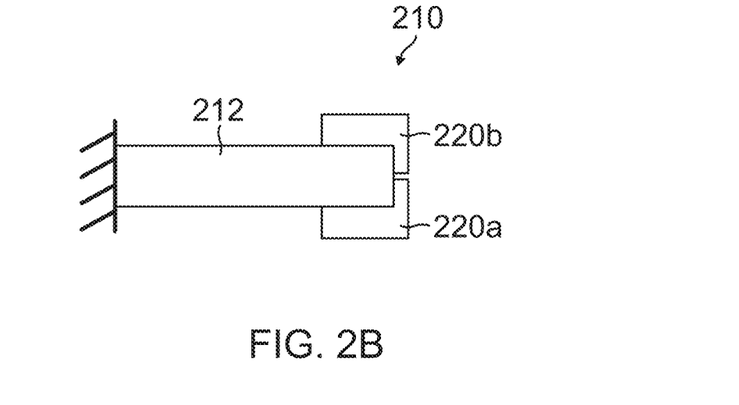
FIG. 2B is a top view of the resonant mechanical sensor of FIG. 2A.

FIGS. 2A and 2B illustrate an exemplary resonant mechanical sensor 210, which can be employed singly or as one of an array of resonant mechanical sensors in a passive smart sensor detection system. The resonant mechanical sensor 210 is implemented as a switch and can be configured to vibrate at a frequency generated by a target of interest for which the detection system is employed.

The resonant mechanical sensor 210 has a switching mechanism comprising a sensor beam 212, and a set of electrode portions 220a, 220b. The sensor beam 212 extends to a distal end having a lip portion 216. A conductive layer 218 is coupled to lip portion 216. The electrode portions 220a, 220b are located under sensor beam 212 such that conductive layer 218 overhangs and faces electrode portions 220a, 220b.

FIG. 2A shows the switching mechanism of resonant mechanical sensor 210 in an open position, with conductive layer 218 spaced apart from electrode portions 220a, 220b. When a signal input at a signature frequency of resonant mechanical sensor 210 is above a pre-determined threshold, sensor beam 212 vibrates and causes conductive layer 218 to contact electrode portions 220a, 220b. When conductive layer 218 contacts electrode portions 220a, 220b, the switching mechanism of resonant mechanical sensor 210 is in a closed position.

Figure 3:
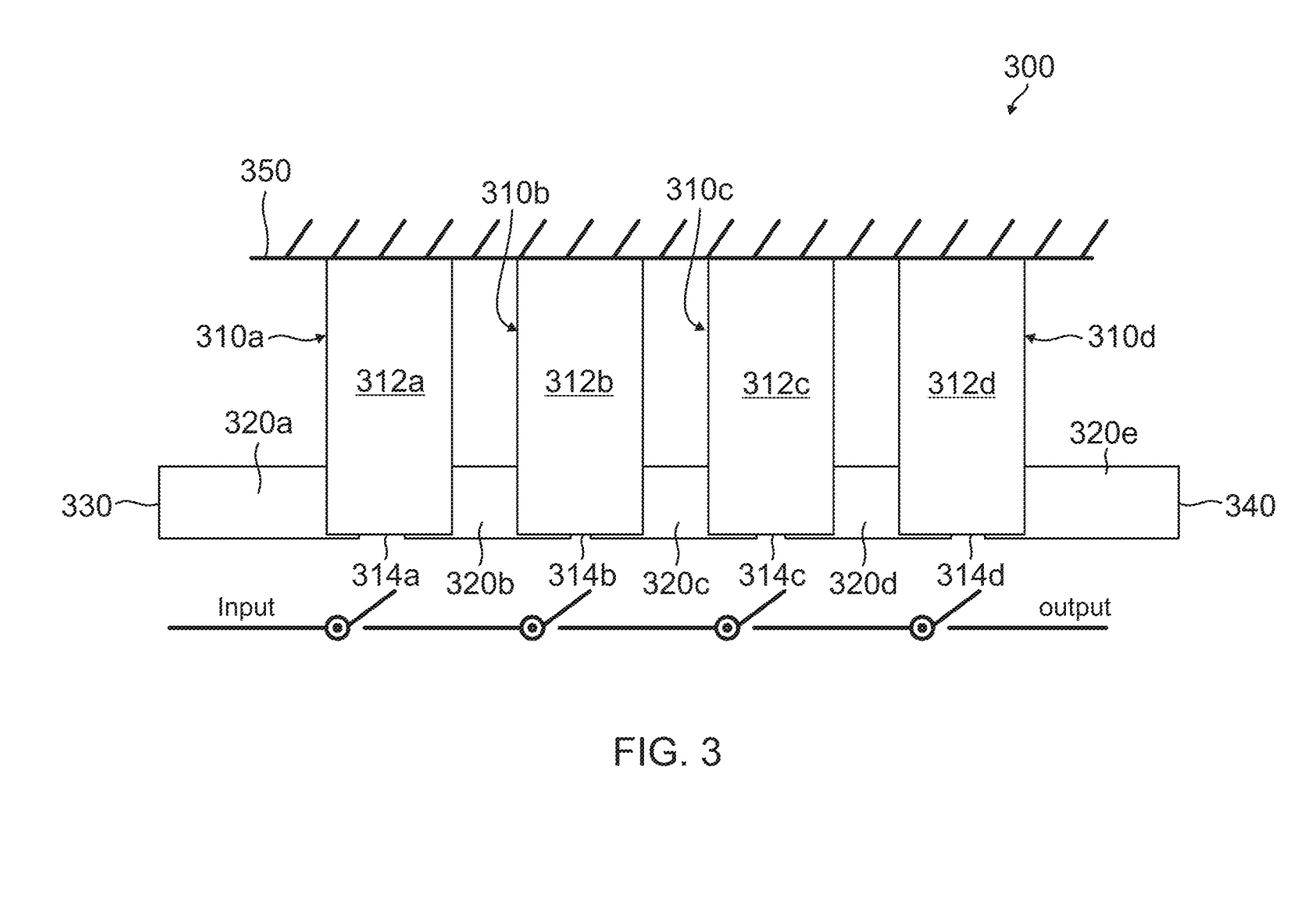
FIG. 3 is a schematic diagram of a passive vehicle detection system, according to one embodiment.

FIG. 3 illustrates a passive vehicle detection system 300, according to one embodiment. The detection system 300 includes an array of resonant mechanical sensors, including a first sensor 310a, a second sensor 310b, a third sensor 310c, and a fourth sensor 310d, which are all connected together in series. The sensors 310a-310d are implemented as switches that are configured to vibrate at frequencies generated by a target of interest.

Each of sensors 310a-310d have a similar structure as resonant mechanical sensor 210 described above. As such, each of sensors 310a-310d has a switching mechanism comprising respective sensor beams 312a-312d that extend to respective distal ends 314a-314d, with conductive layers coupled to respective lip portions at each of the distal ends. The conductive layers of sensors 310a-310d overhang and face respective electrode portions 320a-320e. In particular, a first conductive layer of sensor 310a overhangs and faces electrode portions 320a and 320b; a second conductive layer of sensor 310b overhangs and faces electrode portions 320b and 320c; a third conductive layer of sensor 310c overhangs and faces electrode portions 320c and 320d; and a fourth conductive layer of sensor 310d overhangs and faces electrode portions 320d and 320e.

The detection system 300 includes an input end 330 at electrode portion 320a, and an output end 340 at electrode portion 320e. The sensors 310a-310d are connected together in series by a coupling bus 350. The input end 330 can be coupled to a power source, and the output end 340 can be connected to a transmitter.

Each of sensors 310a-310d are configurable to detect different resonant signature frequencies generated by a target of interest. In one example, sensor 310a can be configured to detect a first acoustic signal frequency of a vehicle (e.g., 55 Hz); sensor 310b can be configured to detect a second acoustic signal frequency of the vehicle (e.g., 116 Hz); sensor 310c can be configured to detect a third acoustic signal frequency of the vehicle (e.g., 131 Hz); and sensor 310d can be configured to detect a fourth acoustic signal frequency of the vehicle (e.g., 232 Hz).

When acoustic signals input at the signature frequencies of each of sensors 310a-310d are above pre-determined thresholds, each of sensor beams 312a-312d respectively vibrates and causes the conductive layers of the sensors to contact electrode portions 320a-320e. At a given point in time, all of the switching mechanisms of each of sensors 310a-310d are in a closed position. This triggers the system such that a signal is sent to a transmitter, which then transmits a signal to a receiver/processor notifying that a vehicle of interest has been detected.

It should be understood that in other embodiments, more or less than four sensors can be utilized in implementing a passive vehicle detection system. The number of sensors depends on how many are needed to identify a particular vehicle through its frequency signature. While one sensor can work, typically, most vehicles will be detected by the use of two or more sensors.

Figure 4:
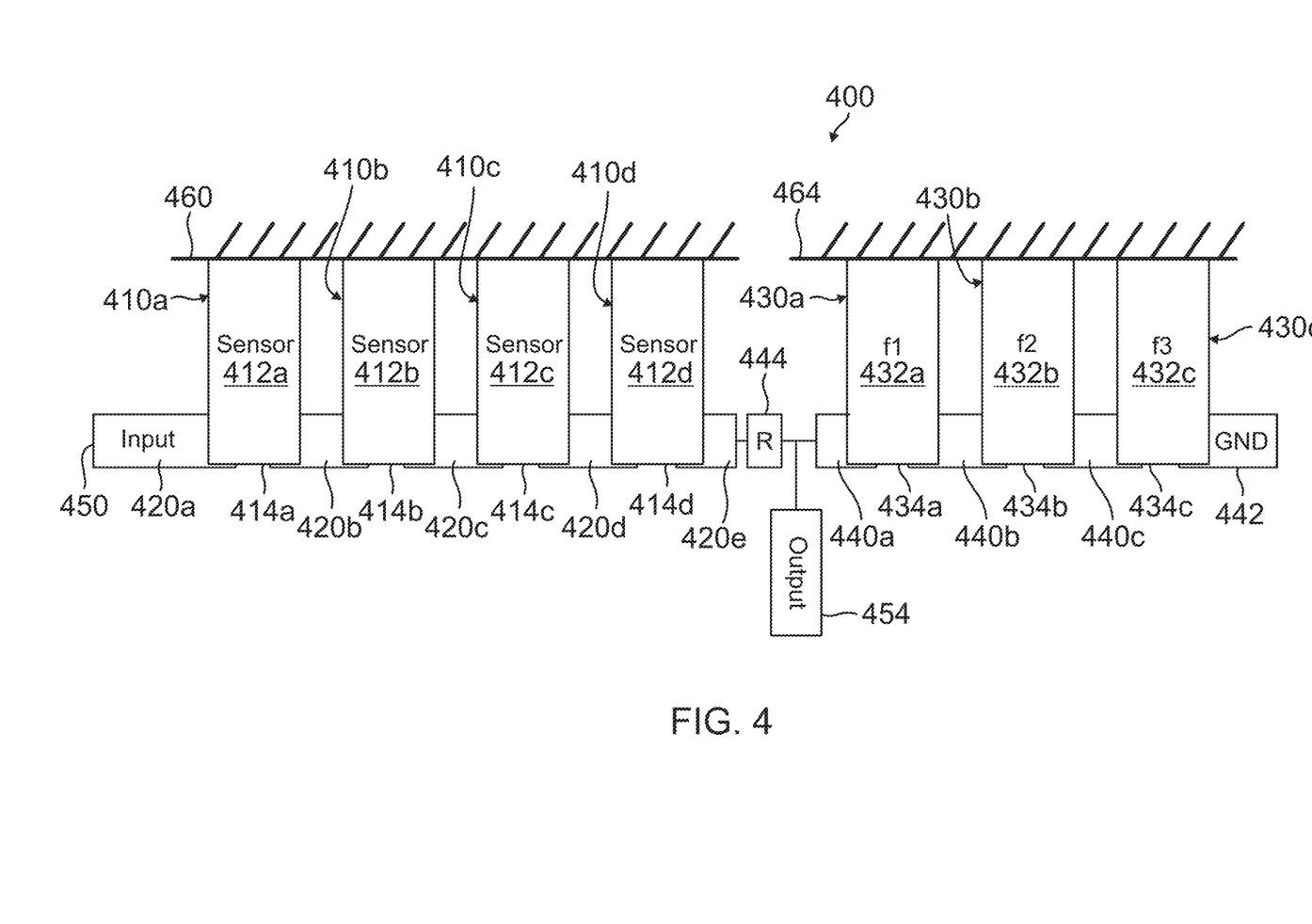
FIG. 4 is a schematic diagram of a passive vehicle detection system, according to another embodiment.

FIG. 4 illustrates a passive vehicle detection system 400, according to another embodiment, which provides for wideband noise rejection. The detection system 400 includes a first array of resonant mechanical sensors, including a first sensor 410a, a second sensor 410b, a third sensor 410c, and a fourth sensor 410d, which are all connected together in series. The sensors 410a-410d are implemented as switches that are configurable to detect frequencies generated by a target of interest.

Each of sensors 410a-410d have a similar structure as resonant mechanical sensor 210 described above. As such, each of sensors 410a-410d has a switching mechanism comprising respective sensor beams 412a-412d that extend to respective distal ends 414a-414d, with conductive layers coupled to respective lip portions at each of the distal ends. The conductive layers of sensors 410a-410d overhang and face respective electrode portions 420a-420e. In particular, a first conductive layer of sensor 410a overhangs and faces electrode portions 420a and 420b; a second conductive layer of sensor 410b overhangs and faces electrode portions 420b and 420c; a third conductive layer of sensor 410c overhangs and faces electrode portions 420c and 420d; and a fourth conductive layer of sensor 410d overhangs and faces electrode portions 420d and 420e.

The detection system 400 also includes a second array of non-resonant mechanical sensors 430a, 430b, and 430c, which are configured to eliminate false alarms due to wide band noise. The sensors 430a-430c are designed to operate at non-signature frequencies (e.g., $f_1$, $f_2$, $f_3$) and can be connected in series, as shown in FIG. 4.

Each of sensors 430a-430c include respective sensor beams 432a-432c that extend to respective distal ends 434a-434c, with conductive layers coupled to respective lip portions at each of the distal ends. The conductive layers of sensors 432a-432c overhang and face respective electrode portions 440a-440c and a ground 442. In particular, a conductive layer of sensor 430a overhangs and faces electrode portions 440a and 440b; a conductive layer of sensor 430b overhangs and faces electrode portions 440b and 440c; and a conductive layer of sensor 430c overhangs and faces electrode portion 440c and ground 442.

The first and second arrays of sensors 410a-410d and 430a-430c are electrically connected together, with electrode portion 420e coupled to electrode portion 440a. A resistor 444 can be connected between electrode portion 420e and electrode portion 440a.

The detection system 400 includes an input end 450 at electrode portion 420a. An output end 454 is coupled to the connection between electrode portion 420e and electrode portion 440a. The sensors 410a-410d are connected together in series by a coupling bus 460. The sensors 430a-430c are connected together in series by a coupling bus 464.

Each of sensors 410a-410d are configurable to detect different resonant signature frequencies generated by a target of interest. In one example, sensor 410a can be configured to detect a first acoustic signal frequency of a vehicle (e.g., 55 Hz); sensor 410b can be configured to detect a second acoustic signal frequency of the vehicle (e.g., 116 Hz); sensor 410c can be configured to detect a third acoustic signal frequency of the vehicle (e.g., 131 Hz); and sensor 410d can be configured to detect a fourth acoustic signal frequency of the vehicle (e.g., 232 Hz).

When acoustic signals input at the signature frequencies of each of sensors 410a-410d are above pre-determined thresholds, each of sensor beams 412a-412d respectively vibrates and causes the conductive layers of the sensors to contact electrode portions 420a-420e. At a given point in time, all of the switching mechanisms of each of sensors 410a-410d are in a closed position. This allows a signal to be sent to a transmitter, which transmits a signal to a processor of the detection system notifying that a vehicle of interest has been detected.

A false positive due to wideband noise can be nulled with sensors 430a-440c. For example, if all of sensors 410a-410d and 430a-440c are triggered together, the corresponding output signal can be classified as white noise and can be ignored. If only sensors 410a-410d are triggered together, then the corresponding output signal can be classified as a detected vehicle of interest.

Figure 5:
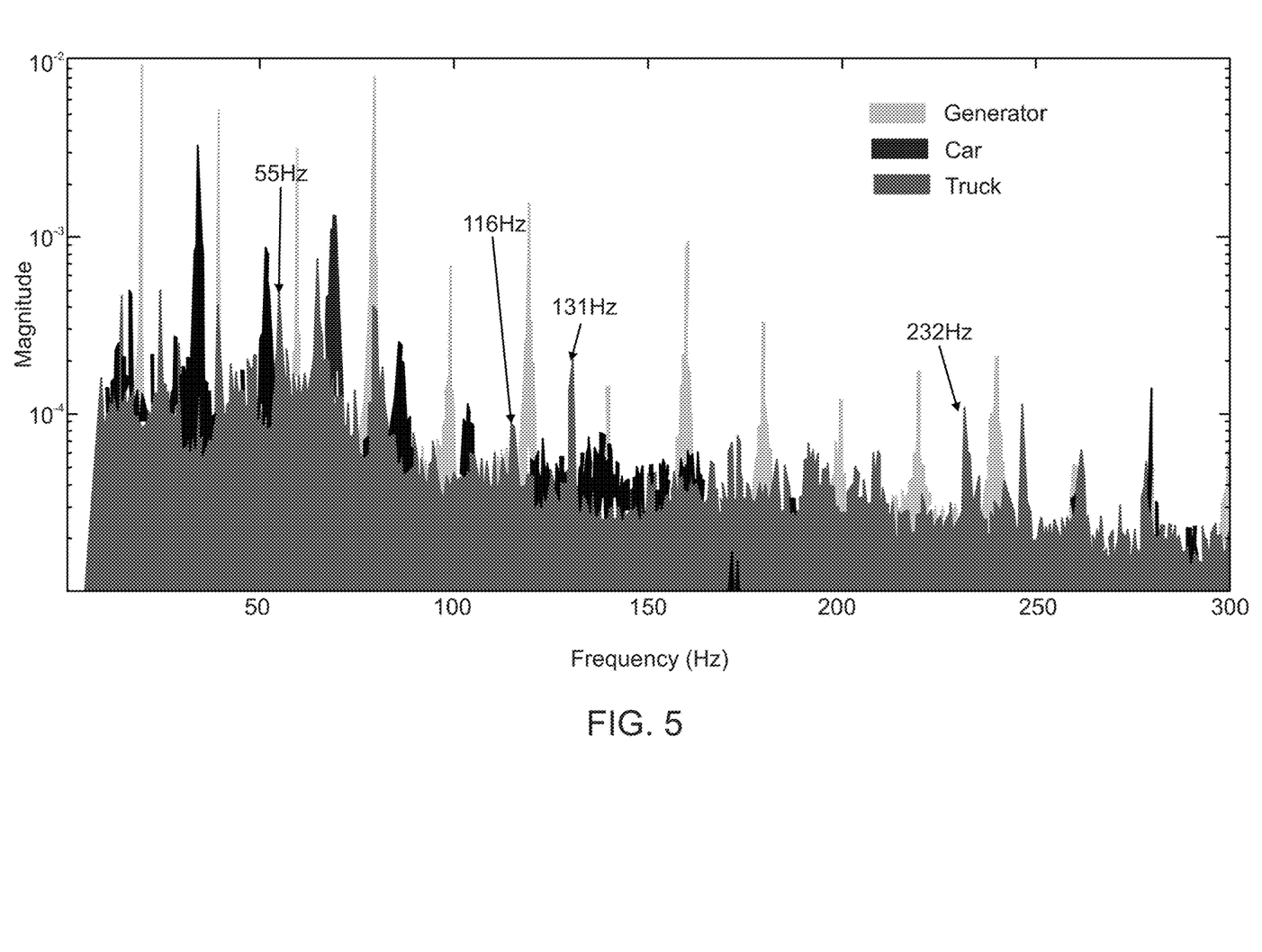
FIG. 5 is a graphical representation of an exemplary acoustic signal frequency spectrum of different target vehicles.

FIG. 5 is a graphical representation of an exemplary acoustic signal frequency spectrum of different target vehicles, including a power generator, a car, and a truck. For example, acoustic spectral peaks located at 55 Hz, 116 Hz, 131 Hz, and 232 Hz provide the signature frequency of the truck. FIG. 5 shows the fast Fourier transform (EFT) of the acoustic signals from the targets vehicles.

In one example, an objective is to detect and identify the truck signals from all of the rest of the signals. Compared to the other target vehicles, the truck has unique signatures at frequencies of 55 Hz, 116 Hz, 131 Hz, and 232 Hz, with a large signal to noise ratio (SNR) compared to the background. To passively select and detect signatures at these frequencies, high quality factor narrow band passive sensors with resonant frequencies tuned to the signature frequencies are utilized. The narrow band nature of the sensors will enable frequency decomposition and selection.

Figure 6:
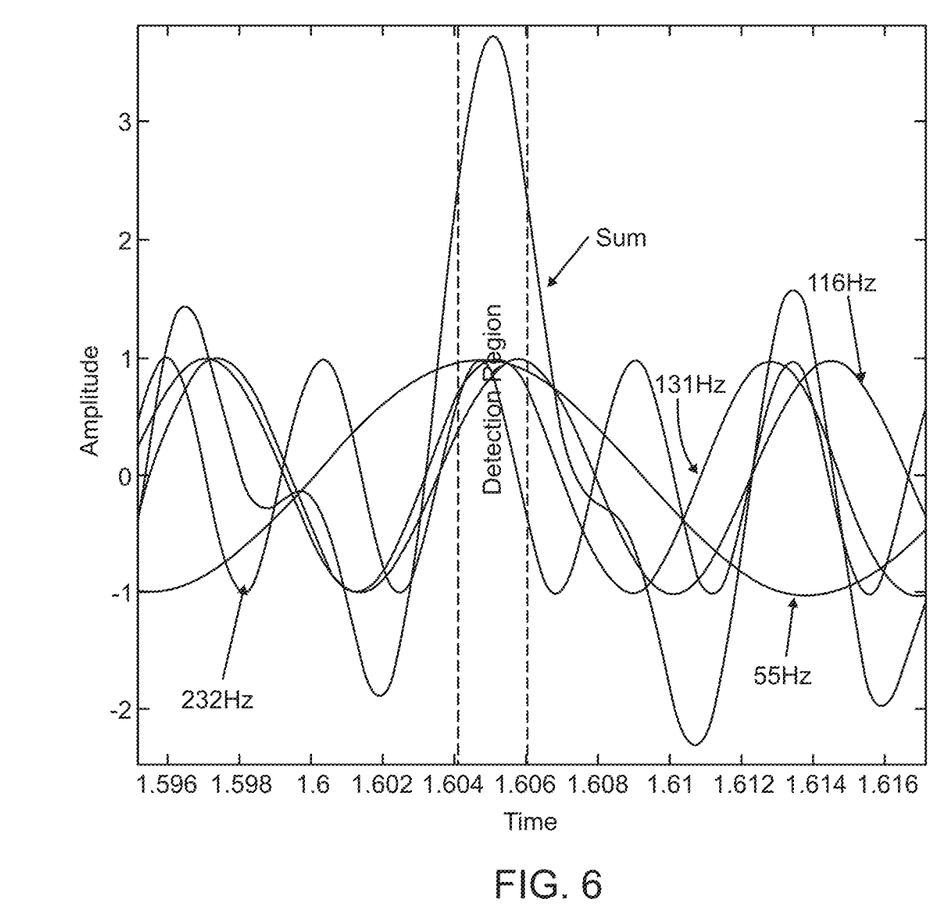
FIG. 6 is a graphical representation of an exemplary simulation of vibration amplitude of four resonant mechanical sensors in a passive vehicle detection system.

FIG. 6 is a graphical representation of an exemplary simulation of vibration amplitude of four resonant mechanical sensors in a passive vehicle detection system, such as shown in FIG. 3. The vibration amplitudes at a given time of the four sensors at 55 Hz, 116 Hz, 131 Hz, and 232 Hz are all sufficiently large to close all the switches in series, which will trigger an output, allowing the vehicle (e.g., truck) to be detected by the detection system.

As shown in FIG. 6, a positive detection region for the vehicle is triggered when the signal strength at all signature frequencies are above their threshold levels. The threshold levels are pre-determined for a specific application. In order to trigger the output, all four sensors need to have a large enough amplitude such that the switching mechanism will be closed at the same time.

FIGS. 7A-7E show an exemplary process for fabrication of passive sensor devices, such as silicon-based mechanical sensors, which can be implemented in the passive vehicle detection system described herein. While different materials can be used to fabricate the sensor devices, the following description is based on the use of silicon wafer materials.

Figure 7A:
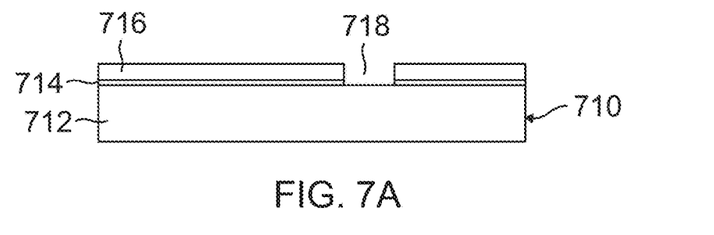
FIGS. 7A-7E are schematic diagrams of an exemplary process for fabrication of passive sensors, which can be implemented in a passive vehicle detection system.

Initially, a wafer 710 is provided, such as a silicon on insulator (SOI) wafer. The wafer 710 includes a handle substrate layer 712, an insulator layer 714 over handle substrate layer 712, and a device layer 716 over insulator layer 714.

Figure 7B:
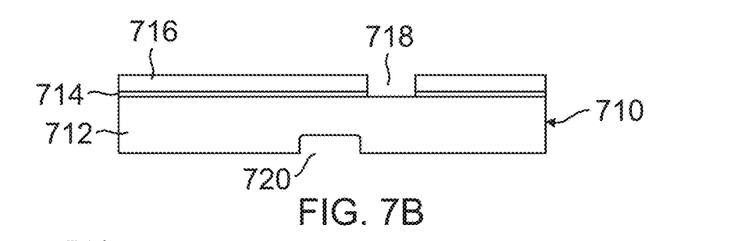
Figure 7C:
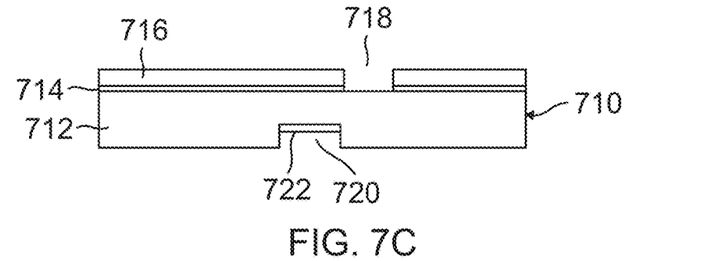

The device layer 716 is patterned and etched to form at least one opening 718, as shown in FIG. 7A. The handle substrate layer 712 is then patterned and etched on an opposite side from device layer 716 to form another opening 720, as depicted in FIG. 7B. A conductive layer 722 is then deposited and patterned in opening 720 of handle substrate layer 712, as shown in FIG. 7C. The conductive layer can be formed with various metal materials such as gold.

Figure 7D:
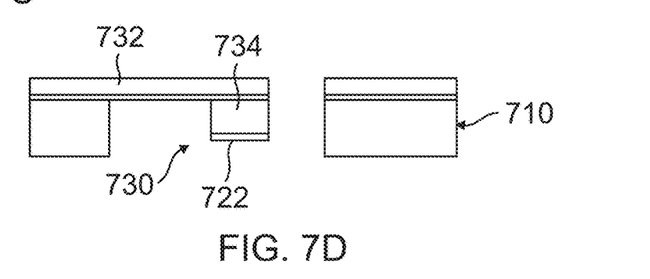
Figure 7E:
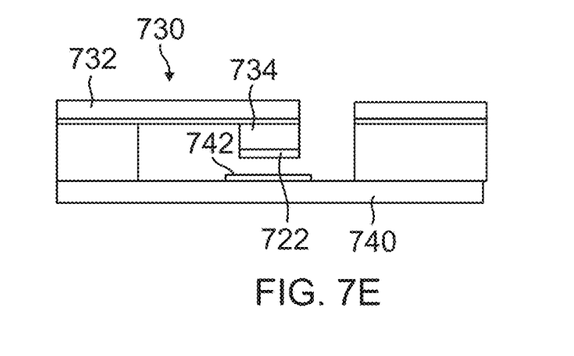

As illustrated in FIG. 7D, wafer 710 is then patterned and etched to form at least one sensor structure 730, which includes at least one sensor beam 732, which extends to a distal end having a lip portion 734 that includes conductive layer 722. As shown in FIG. 7E, sensor structure 730 is bonded with an electrical routing wafer 740 that includes one or more electrode portions 742, such that conductive layer 722 overhangs and faces electrode portions 742, to form a sensor device.

While the fabrication of a single sensor device is shown in FIGS. 7A-7E, it should be understood that this process can be used to fabricate an array of such sensor devices. In one example, an array of such sensor devices can be fabricated together on the same die.

Example Embodiments

Example 1 includes a passive sensor detection system, comprising: a first array of resonant mechanical sensors connected in series, each of the resonant mechanical sensors configured to detect respectively different signature frequencies of a signal generated by a target of interest; a transmitter operatively coupled to the array of resonant mechanical sensors; and a power supply coupled to the array of resonant mechanical sensors and the transmitter; wherein when the array of resonant mechanical sensors are triggered by the signal generated by the target of interest, the transmitter is powered on to transmit a signal indicating the detection of the target of interest.

Example 2 includes the system of Example 1, wherein the resonant mechanical sensors comprise acoustic sensors, vibration sensors, or magnetic sensors.

Example 3 includes the system of Example 1, wherein each of the resonant mechanical sensors are configured to detect respectively different acoustic signal frequencies generated by a target of interest.

Example 4 includes the system of Example 1, wherein each of the resonant mechanical sensors are configured to detect respectively different vibration signal frequencies generated by the target of interest.

Example 5 includes the system of Example 1, wherein each of the resonant mechanical sensors includes a switch mechanism comprising: a sensor beam that extends to a distal end having a lip portion, wherein a conductive layer is coupled to the lip portion; and a set of electrode portions under the sensor beam, wherein the conductive layer overhangs and faces the set of electrode portions.

Example 6 includes the system of Example 5, wherein when acoustic signals at the signature frequencies are detected by the resonant mechanical sensors and are above a pre-determined threshold, each sensor beam respectively vibrates and causes the conductive layer to contact the set of electrode portions, such that the switch mechanism is in a closed position, allowing a detection signal to be sent to the transmitter.

Example 7 includes the system of Example 6, wherein the transmitter is operative to send the signal indicating the detection of the target of interest to a receiver coupled to a processor of the detection system.

Example 8 includes the system of Example 7, wherein the transmitter comprises a radio frequency (RF) signal transmitter operative to send an RF signal to the receiver.

Example 9 includes the system of any of Examples 1-8, wherein the target of interest comprises a vehicle.

Example 10 includes the system of any of Examples 1-9, wherein the target of interest comprises a mobile ground vehicle.

Example 11 includes the system of Example 1, wherein the first array of resonant mechanical sensors includes at least four resonant mechanical sensors, each of which are configured to respectively detect four different acoustic signal frequencies generated by a target of interest.

Example 12 includes the system of any of Examples 1-11, further comprising a second array of non-resonant mechanical sensors, which are connected to the first array of resonant mechanical sensors, the second array of non-resonant mechanical sensors configured to eliminate false alarms due to wide band noise.

Example 13 includes the system of Example 12, wherein the second array of non-resonant mechanical sensors are configured to operate at non-signature frequencies of a target of interest and are connected in series with each other.

Example 14 includes the system of Example 13, wherein each of the non-resonant mechanical sensors includes a switch mechanism comprising: a sensor beam that extends to a distal end having a lip portion, wherein a conductive layer is coupled to the lip portion; and a set of electrode portions under the sensor beam, wherein the conductive layer overhangs and faces the set of electrode portions.

Example 15 includes the system of any of Examples 13-14, wherein the second array of non-resonant mechanical sensors includes at least three non-resonant mechanical sensors, each of which are configured to respectively operate at three different non-signature frequencies.

Example 16 includes a method of fabricating one or more passive sensor devices, the method comprising: providing a wafer comprising a handle substrate layer, an insulator layer over the handle substrate layer, and a device layer over the insulator layer; patterning and etching the device layer to form at least one first opening in the device layer; patterning and etching the handle substrate layer to form at least a second opening in the handle substrate layer; depositing and patterning a conductive layer in the at least one second opening; patterning and etching the wafer to form at least one sensor structure, which includes at least one sensor beam that extends to a distal end having a lip portion that includes the conductive layer; and bonding the sensor structure with an electrical routing wafer that includes one or more electrode portions, such that the conductive layer overhangs and faces the one or more electrode portions.

Example 17 includes the method of Example 16, wherein the at least one sensor structure comprises a resonant mechanical sensor configured to vibrate at an acoustic signal frequency generated by a target of interest.

Example 18 includes a passive sensor detection method, comprising: providing an array of resonant mechanical sensors connected in series, each of the resonant mechanical sensors configured to detect respectively different signature frequencies of a signal generated by a target of interest; triggering the array of resonant mechanical sensors when the signal is generated by the target of interest; powering on a transmitter when the resonant mechanical sensors are triggered; and transmitting a signal from the transmitter to a receiver/processor indicating the detection of the target of interest.

Example 19 includes the method of Example 18, wherein the resonant mechanical sensors comprise acoustic sensors, vibration sensors, or magnetic sensors.

Example 20 includes the method of any of Examples 18-19, wherein the target of interest comprises a vehicle.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A passive sensor detection system, comprising:
    a first array of resonant mechanical sensors connected in series, each of the resonant mechanical sensors configured to detect respectively different signature frequencies of a signal generated by a target of interest, wherein each of the resonant mechanical sensors includes a switch mechanism comprising:
        a sensor beam that extends to a distal end having a lip portion, wherein a conductive layer is coupled to the lip portion; and
        a set of electrode portions under the sensor beam, wherein the conductive layer overhangs and faces the set of electrode portions;
    a transmitter operatively coupled to the array of resonant mechanical sensors; and
    a power supply coupled to the array of resonant mechanical sensors and the transmitter;
    wherein when the array of resonant mechanical sensors are triggered by the signal generated by the target of interest, the transmitter is powered on to transmit a signal indicating the detection of the target of interest.

2. The system of claim 1, wherein the resonant mechanical sensors comprise acoustic sensors, vibration sensors, or magnetic sensors.

3. The system of claim 1, wherein each of the resonant mechanical sensors are configured to detect respectively different acoustic signal frequencies generated by the target of interest.

4. The system of claim 1, wherein each of the resonant mechanical sensors are configured to detect respectively different vibration signal frequencies generated by the target of interest.

5. The system of claim 1, wherein when acoustic signals at the signature frequencies are detected by the resonant mechanical sensors and are above a pre-determined threshold, each sensor beam respectively vibrates and causes the conductive layer to contact the set of electrode portions, such that the switch mechanism is in a closed position, allowing a detection signal to be sent to the transmitter.

6. The system of claim 5, wherein the transmitter is operative to send the signal indicating the detection of the target of interest to a receiver coupled to a processor of the detection system.

7. The system of claim 6, wherein the transmitter comprises a radio frequency (RF) signal transmitter operative to send an RF signal to the receiver.

8. The system of claim 1, wherein the target of interest comprises a vehicle.

9. The system of claim 1, wherein the target of interest comprises a mobile ground vehicle.

10. The system of claim 1, wherein the first array of resonant mechanical sensors includes at least four resonant mechanical sensors, each of which are configured to respectively detect four different acoustic signal frequencies generated by the target of interest.

11. The system of claim 1, further comprising a second array of non-resonant mechanical sensors, which are connected to the first array of resonant mechanical sensors, the second array of non-resonant mechanical sensors configured to eliminate false alarms due to wide band noise.

12. The system of claim 11, wherein the second array of non-resonant mechanical sensors are configured to operate at non-signature frequencies of the target of interest and are connected in series with each other.

13. The system of claim 12, wherein each of the non-resonant mechanical sensors includes a switch mechanism comprising:
- a sensor beam that extends to a distal end having a lip portion, wherein a conductive layer is coupled to the lip portion; and
- a set of electrode portions under the sensor beam, wherein the conductive layer overhangs and faces the set of electrode portions.

14. The system of claim 12, wherein the second array of non-resonant mechanical sensors includes at least three non-resonant mechanical sensors, each of which are configured to respectively operate at three different non-signature frequencies.

15. A passive sensor detection method, comprising:
providing an array of resonant mechanical sensors connected in series, each of the resonant mechanical sensors configured to detect respectively different signature frequencies of a signal generated by a target of interest, wherein each of the resonant mechanical sensors includes a switch mechanism comprising:
- a sensor beam that extends to a distal end having a lip portion, wherein a conductive layer is coupled to the lip portion; and
- a set of electrode portions under the sensor beam, wherein the conductive layer overhangs and faces the set of electrode portions;

triggering the array of resonant mechanical sensors when the signal is generated by the target of interest;
powering on a transmitter when the resonant mechanical sensors are triggered; and
transmitting a signal from the transmitter to a receiver/processor indicating the detection of the target of interest.

16. The method of claim 15, wherein the resonant mechanical sensors comprise acoustic sensors, vibration sensors, or magnetic sensors.

17. The method of claim 15, wherein the target of interest comprises a vehicle.

18. A passive sensor detection system, comprising:
- a first array of resonant mechanical sensors connected in series, each of the resonant mechanical sensors configured to detect respectively different signature frequencies of a signal generated by a target of interest;
- a second array of non-resonant mechanical sensors, which are connected to the first array of resonant mechanical sensors, the second array of non-resonant mechanical sensors configured to eliminate false alarms due to wide band noise;
- a transmitter operatively coupled to the array of resonant mechanical sensors; and
- a power supply coupled to the array of resonant mechanical sensors and the transmitter;
- wherein when the array of resonant mechanical sensors are triggered by the signal generated by the target of interest, the transmitter is powered on to transmit a signal indicating the detection of the target of interest.

19. The system of claim 18, wherein the second array of non-resonant mechanical sensors are configured to operate at non-signature frequencies of the target of interest and are connected in series with each other.

20. The system of claim 18, wherein the target of interest comprises a vehicle.

\* \* \* \* \*